US005795603A

United States Patent [19]
Burger

[11] Patent Number: 5,795,603
[45] Date of Patent: *Aug. 18, 1998

[54] PROCESS FOR FORMING A FILLED TORROIDAL BAGEL PRODUCT

[76] Inventor: Alvin Burger, 7876 SW. 89th La., Miami, Fla. 33156

[*] Notice: The term of this patent shall not extend beyond the expiration date of Pat. No. 5,236,724.

[21] Appl. No.: 602,486

[22] Filed: Feb. 20, 1996

Related U.S. Application Data

[63] Continuation-in-part of Ser. No. 577,965, Dec. 26, 1995, Pat. No. 5,654,021, and Ser. No. 577,963, Dec. 26, 1995, Pat. No. 5,641,527, each is a continuation-in-part of Ser. No. 106,763, Aug. 16, 1993, Pat. No. 5,514,395, which is a continuation-in-part of Ser. No. 816,010, Dec. 31, 1991, Pat. No. 5,236,724.

[51] Int. Cl.$^6$ .................................................. A21D 13/00
[52] U.S. Cl. .................. 426/94; 426/19; 426/62; 426/283; 426/284; 426/499; 426/502; 426/514; 426/549; 425/319
[58] Field of Search ..................... 426/94, 19, 21, 426/549, 499, 275, 504, 61, 62, 284, 502, 514, 283; 425/319, 130, 403

[56] References Cited

U.S. PATENT DOCUMENTS

| | | | |
|---|---|---|---|
| 3,433,182 | 3/1969 | Thompson | 425/319 |
| 5,236,724 | 8/1993 | Burger | 426/94 |
| 5,281,120 | 1/1994 | Morikawa et al. | 426/502 |
| 5,290,577 | 3/1994 | Tashiro | 426/283 |
| 5,312,633 | 5/1994 | Schwartz | 426/94 |

*Primary Examiner*—Lien Tran
*Attorney, Agent, or Firm*—Stein, Pendorf & Van Der Wall

[57] ABSTRACT

A process of making a filled bagel dough product and the product formed thereby. The product has the outward appearance of a conventional bagel, but has a core filling such as a natural or imitation cream cheese provided within the bagel dough shell. More particularly, a method and device by which a conventional bagel making apparatus as found in most bagel shops can be adapted to making filled, rolled bagel dough products. The invention further concerns a bagel which, in addition to being improved in flavor and texture, can be produced with much less baking time than a conventional solid bagel.

16 Claims, 2 Drawing Sheets

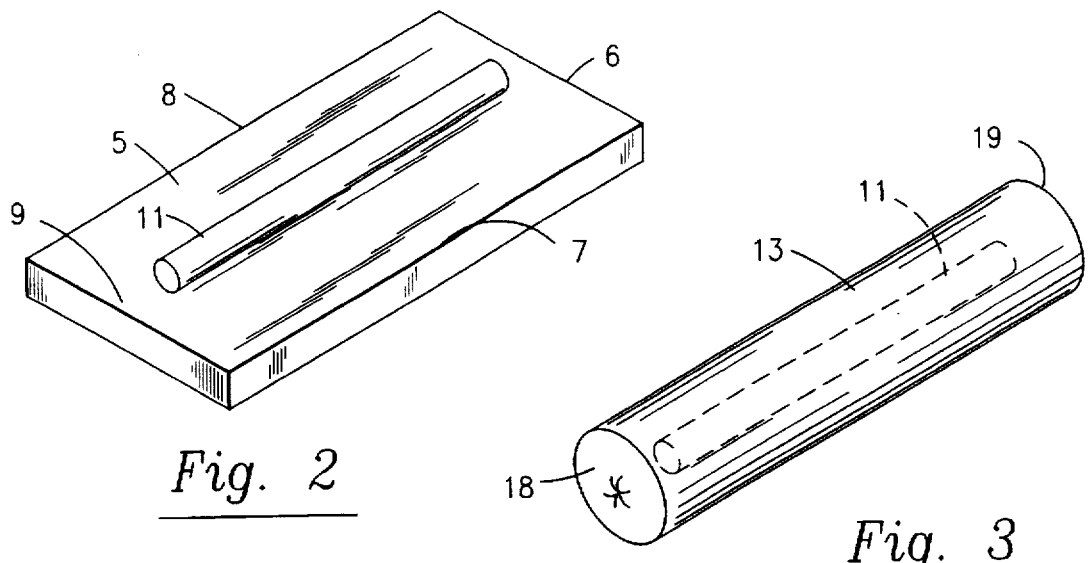
*Fig. 2*
*Fig. 3*
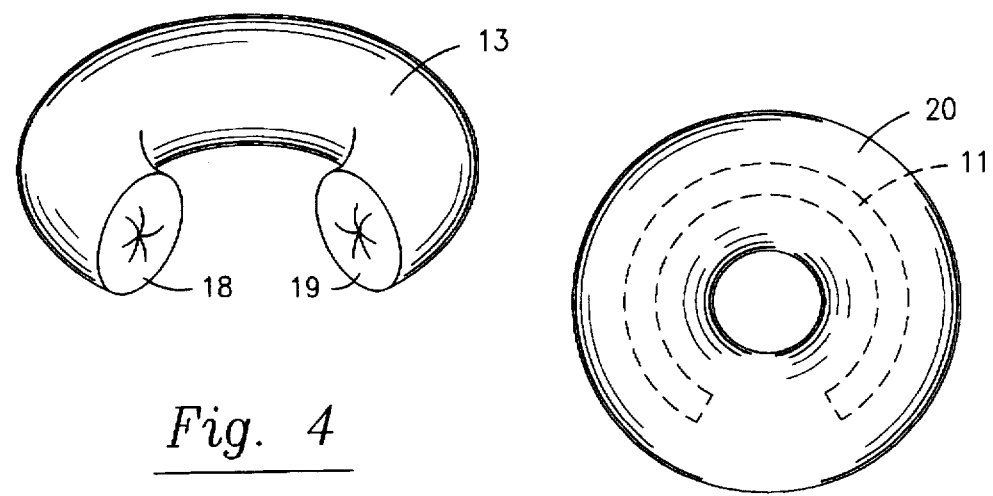
*Fig. 4*
*Fig. 5*

PROCESS FOR FORMING A FILLED TORROIDAL BAGEL PRODUCT

REFERENCE TO RELATED APPLICATIONS

This is a continuation-in-part of application Ser. No. 08/577,965 filed Dec. 26, 1995, now U.S. Pat. No. 5,654,021, entitled "FILLED STEAMED BAGEL DOUGH PRODUCT AND METHOD", and a continuation-in-part of application Ser. No. 08/577,963 filed Dec. 26, 1995, now U.S. Pat. No. 5,641,527 entitled "FILLED BOILED BAGEL DOUGH PRODUCT AND METHOD", both of which were continuation-in-part of application Ser. No. 08/106,763 filed Aug. 16, 1993, now U.S. Pat. No. 5,514,395 entitled "FILLED BAGEL DOUGH PRODUCT AND METHOD", which was a continuation-in-part of application Ser. No. 07/816,010 filed Dec. 31, 1991, entitled "FILLED DOUGH BAGEL PRODUCT AND METHOD", which issued as U.S. Pat. No. 5,236,724.

BACKGROUND OF THE INVENTION

1. Field of the Invention

The present invention concerns a unique product having the outward appearance of a conventional bagel, but having an axial ring of a filling such as a natural or imitation cream cheese provided within the bagel dough shell. More particularly, the invention concerns a method and device by which a conventional bagel making apparatus as found in most bagel shops can be adapted to making filled, rolled bagel dough products. The invention further concerns a bagel which, in addition to being improved in flavor and texture, can be produced with much less baking time than a conventional solid bagel.

2. Discussion of the Related Art

The present inventor has extensively studied the bagel making process and has discovered a process by which cream cheese could be incorporated into a bagel dough shell and this shaped raw product could be further processed into a baked bagel dough product containing cream cheese. Surprisingly, the baking process, rather than damage the cream cheese, stabilizes the cream cheese. Further, a small outer layer of the moist cream cheese filling contributes to the steaming and forming a skin on the inner lumen of the bagel shell. This discovery was the basis of U.S. Pat. No. 5,236,724.

The inventor subsequently discovered various processes by which bagel dough shells and cream cheese fillings of various sizes could be combined and these differently dimensioned bagel products could be processed and baked to preserve the cream cheese filling yet form baked filled bagel products containing fresh cream cheese or the like. For example, the inventor discovered a process by which a product with a six inch diameter, as thick as three inches, and weighing as much as one pound could be reliably produced with excellent texture and taste. However, although the various products had desirable properties, each required new or additional special devices or equipment which a bagel manufacturer would have had to additionally purchase in order to produce these products. For example, the process for forming a filled bagel required a complex specialized device and required close monitoring, adjustment and control in order to produce filled torroidal bagel products having a conventional appearance.

Accordingly, the present inventor felt a need for a simplified, reliable, fool-proof process and device for forming traditional shaped bagels, but with a cream cheese filling.

SUMMARY OF THE INVENTION

It is an object of the present invention to provide a cream cheese-filled bagel dough product which has the outward appearance of a conventional bagel, which has the chewy bagel dough texture of a New York style bagel, and which is filled in the core with an even ring of cream cheese.

It is a further object of the present invention to provide a filled bagel dough product which can be consumed with great convenience, for example, while driving a car, while walking, while walking in a shopping mall, while viewing a sports activity or while engaged in other activities.

It is a further object of the invention to provide a filled bagel dough product which can be handled and treated in a conventional manner, which can be frozen and stored for long periods of time, which can be easily heated and prepared either by a retailer or by a consumer at home, and which provides the distinctive New York style bagel taste while providing a fresh cream cheese filling which adds to the taste and enjoyment of a New York bagel.

The present inventor has further extensively studied and experimented in the bagel making art and has discovered a process and device by which a conventional bagel making plant can be easily adapted to producing filled, rolled bagel dough products which have the outward appearance and size of conventional bagels, but which have a ring of cream cheese or the like, such as an artificial cream cheese, preferably a tofu based artificial cream cheese, incorporated in the core thereof.

It is a further surprising discovery that the filled, rolled bagel dough product according the present invention can be processed in a shorter amount of time than a conventional bagel dough product.

It is a further surprising discovery that the intermediate filled bagel shell according to the present invention can be subjected to the handling techniques of a conventional bagel shape without loss of integrity. That is, it is surprising that a filled raw bagel dough product can survive the rolling and handling of a conventional bagel forming apparatus, without loss of integrity.

Surprisingly, the product of the invention can be freezer stored, where traditional solid cream cheese could not be freezer stored because the uncooked cream cheese curdles. Boiling or steaming a chilled cream cheese filled bagel dough product as discussed below after the yeast upon the outside crust of the raised dough has been set acts chemically to modify the cream cheese to allow it to be frozen, together with the bagel shell, so that the texture of the cream cheese, upon reheating, is substantially the same as if it had never been frozen.

Prior to being offered for sale the food product may be fully cooked or may be partially cooked, and may be frozen for long periods of time. The frozen product may be put directly into an oven, and when removed, has the texture and taste of a traditional bagel, except that it is filled with cream cheese.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other filled bread products for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

FIG. 2 shows the flattened sheet of bagel dough with a strand of cream cheese deposited along the longitudinal centerline;

FIG. 3 shows a cream cheese filled bagel cylinder;

FIG. 4 is a partial cut-away view of a filled, rolled bagel dough product according to the present invention; and FIG. 5 is a top cross-sectional view of a filled, rolled bagel dough product according to the present invention.

DETAILED DESCRIPTION OF THE INVENTION

Figure 1:
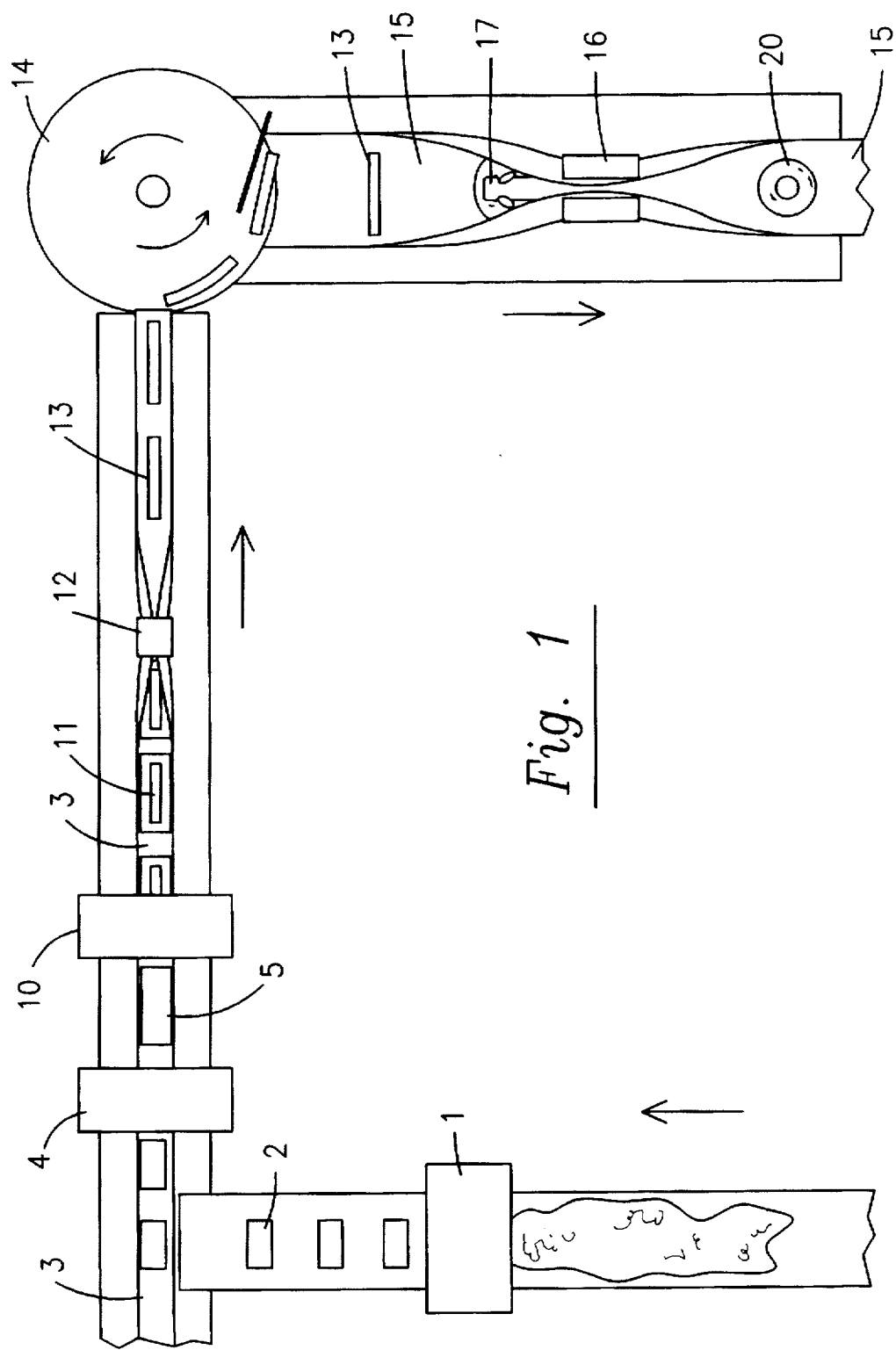
FIG. 1 is a top view of the bagel dough making process modified according to the present invention.

This product and method is related to the subject matter of the previous applications and methods and materials disclosed therein can be used in the present invention as modified by the following discussion.

Bagel fillings

The term "cream cheese", as used herein, is intended to refer to any product such as soft cream cheese, hard cream cheese, ricotta, etc., which can be incorporated in a bagel dough and which gives off sufficient steam in the steaming or baking step of the processes discussed below for forming a skin on the interior surface of the filled bagel dough product. For ease of description the term "cream cheese" is used in the specification, but it is understood that substitutes such as tofu, artificial or imitation cream cheese, marmalade, egg, etc. may be used together with or in place of natural cream cheese.

Preparing bagel dough

Although the present invention is not limited to bagel dough, bagel dough is preferred and the invention will be illustrated with examples using bagel dough. The term "bagel dough" as used herein refers to a very turgid, high protein dough, such as known to make bagels using conventional bagel-making techniques. Such dough is similar to a lean french bread dough, being firm to the touch and easily rolled upon a floured surface. The dough is comprised of a mixture of flour, water, yeast, salt, and, sometimes, sugar. The flour should be a high gluten flour, such as a good clear spring wheat flour with protein content of typically 13.5–14% of flour weight. Water should be added in a quantity of typically 50–53% of flour weight. Salt content should typically be 1.5–2.2% of flour weight. Yeast should be added in a quantity of typically 0.5–2% of flour weight. Sugar, which serves as a food for the yeast and not as a contributor to the final product, should be a dextrose, corn syrup, high fructose or other fermentable sugar, and can be added up to 4% of flour weight. Residual sugar contributes to the browning of the crust during baking.

Although it is possible to obtain and mix all the separate individual ingredients necessary for making a bagel dough, it has been found more convenient to form the bagel dough using a powdered base such that produced by PURATOS COMPANY. In a specific example, 5 lbs. of base are mixed with 50 lbs. of water at 50°–55° F. If the water is too hot, the yeast may subsequently be too active and over develop, thus the initial water temperature should not exceed 55° F. To this base and water are added 14 oz. of yeast, 100 lbs. of high gluten flour, and optionally improvers and flavors. The preferred flour is high in ash and protein and gives the bagel product the distinctive chewy texture. The ingredients are mixed for 10–12 minutes during which time the dough rises in temperature to 75°–78° F. The dough is then allowed to proof or develop for period until it becomes stretchable and workable.

Shaping bagel dough

The proofed dough may be shaped directly, or may be stored overnight or up to 56 hours in a retarder. A retarder differs from a conventional refrigerator in that the circulating air is at a low velocity and humidity is controlled.

Next, the bagel dough is formed into approximately 4 oz. flattened rectangles approximately 6–8 inches long, preferably about 7 inches long, and ¾–3 inches wide, preferably 2 inches. The rectangles may be formed by hand, and the entire filling and process may be performed by hand, but for manufacturing on a large scale it is preferred to manufacture using an automated procedure with conventionally available equipment.

Mechanically, the rectangles may be produced by either dividing then shaping, or flattening then cutting. For dividing first, the dough is fed to a divider 1 which divides the bagel dough into 4 oz. blocks 2. These blocks are dropped onto a conveyor belt 3 subsequently flattened and shaped into rectangles by roller 4. It is necessary that the flattened shapes 5 are generally rectangular, but it is not essential that the shapes have a perfectly rectangular shape with linear edges. All that is necessary is that the flattened shape 5 can be rolled around the cream cheese filling.

For flattening first, the bagel dough is flattened to form a continuous strip from ¼ to ½ inch thick and either 6–8 inches wide or 1¾–2 inches wide, and this continuous ribbon is cut into the desired, e.g., 7×1 inch rectangles.

In the following example, the rectangle will be conveyed along a first conveyor belt in the longitudinal direction, i.e., lengthwise. Thus, the flattened rectangle will be defined by a 1¾ leading edge 6, two 7 inch longitudinal edges 7, 8, and a 1¾ trailing edge 9.

Next, a depositor 10 as conventionally available in the bakery art is used to deposit a strand of approximately 1 oz. of cream cheese 11 beginning approximately ½ inch after the leading edge 6 and ending approximately ½ inch before the trailing edge 9. Precise placement of cream cheese within the rectangle, is not critical, but it is preferred that the strand be deposited half-way between the longitudinal edges. Up until this point, the product manufacturing equipment is equipment which is conventionally available in the bakery art.

The flexible continuous conveyor belt may be, e.g., plastic or rubber coated heavy canvas. The belt may be powdered with a solid release agent or moistened with white divider oil or mineral oil to prevent sticking of the bagel dough to the conveyer and to facilitate release.

The first flexible conveyor belt 3 is drawn longitudinally through the center axis of a tube 12, referred to herein as the forming tube 12, which has an inner circumference approximately equal to the width of the belt 3. Drawing the flexible belt 12 through this tube causes the outer edges of the belt 3 to curl upwards until the edges touch and the belt forms a circular cross section. This rolling of the belt into a tubular shape causes the longitudinal edges 7, 8 of the bagel dough rectangle 5 to roll around the cream cheese 11 and form a cylinder 13 around the cream cheese strand, as shown in FIG. 3.

The dimensions of the belt and dough and cream cheese may be varied as desired so long as the desired rolling process is obtained, i.e., the longitudinal edges of the bagel dough come up and wrap around the cream cheese and contact each other to fuse lightly and form a cylinder around the cream cheese. The dough near the leading and trailing edges of the bagel dough, which do not have any cream cheese deposited thereon, loosely contact each other to close the leading and trailing ends of the rolled cylindrical shape.

The rolled cylinder 13 of bagel dough with cream cheese hermetically sealed in the center axis leaves the forming tube leading-edge first. The flexible belt, no longer constrained by the tube, relaxes and lays flat. The rolled cylinder of bagel dough, which has lightly fused at the top, remains in the form of a cylinder 13.

This elongate cylinder which is 7 inches long and 14 inches in circumference proceeds along the conveyor 3 along its longitudinal axis. For the next step of the process, the step of rolling the cylinder into a ring with leading and trailing edges fused as shown in FIG. 5, requires the cylinder 13 to be moved laterally, i.e., perpendicularly to its elongate direction. This change in direction may be accomplished by any conventional method, such as by a mechanical transfer device, a turn table, or by merely tilting the conveyor belt so that the cylinder rolls off the conveyor belt and is deposited perpendicularly across the second conveyor belt.

Using the example of the turntable 14, the rolled, filled bagel dough shape is deposited by the first conveyor belt along an edge of a turntable 14. As the turntable rotates 90° the bagel cylinder becomes perpendicular to the direction of travel of a second flexible conveyor belt 15. The cylinder of bagel dough 13 is caused to roll off the turntable and is deposited on the second flexible conveyor belt 15.

The second conveyor belt is drawn through a roller tube 16 and thereby rolled into a tube in a manner similar to the first conveyor belt 3 and tube 12, except that the second conveyor belt 15 is approximately 7 inches wide, the rolling tube 16 is correspondingly 7 inches in inner circumference, and the center axis of the roller tube 16 is provided with a mandrel 17 approximately 1 inch in diameter. This rotating turn table, roller tube, and subsequently equipment are conventional equipment commonly available in bagel manufacturing locations.

Accordingly, the rolled, filled and bagel dough cylinder 13 deposited perpendicularly across the second conveyor belt is carried along the second conveyor belt and, as the edges of the belt 15 curl up and around to form a tube, the first and second ends 18, 19 of the bagel dough cylinder 13, previously referred to as the leading and trailing edges of the cylinder, come up and contact each other so that the cylinder is formed into a ring or torroidal shape 20. As the second cylindrical conveyor belt with the rolled, filled bagel dough product provided perpendicularly thereon is drawn through this rolling tube, the rolling action caused by the dough being trapped between the moving outer tube and the stationary mandrel causes the bagel to be worked and the joined surfaces of what was previously a bagel dough rectangle, i.e., the leading and trailing edges and longitudinal edges, to rub against each other and fuse. A well formed, stable, filled, rolled bagel dough product in the shape of a bagel exits the rolling tube.

Although the product leaving the rolling tube has the outward appearance of a conventional bagel 20, the raw bagel dough product contains cream cheese on the inside. This difference in constitution dictates a different set of processing conditions which will be explained below. The bagel dough product in the shape of a bagel is proofed prior to baking. The product after proofing is preferably from 1 to 3 inches thick and from 2 to 6 inches in diameter. The product after proofing preferably weighs from 2 to 10 ounces, and more preferably weighs from 3 to 6 ounces.

In order to better understand the reduction in baking time made possible by the present invention, a conventional baking process will be described first. A conventional solid bagel produced by the conventional equipment discussed above may be baked by either a conventional method involving boiling prior to baking or by a rack oven method involving steaming prior to baking. In a conventional method the bagel is boiled for 1–2 minutes to gelatinize the outer skin of the bagel and to close the outside pores. This wet product is placed on a burlap drawing board, placed in an oven to dry for 1–2 minutes and then flipped over and baked for 10–12 minutes at approximately 490° F.

In the second conventional method, the rack oven method, the bagel is removed from the retarder in which it has been overnight. The bagel is wetted and dipped in a topping. The bagel is then placed on a baking screen where it is permitted to further proof for approximately 15 minutes at 100° F. in 85–90% humidity. The proofed product is then conveyed to an oven at 560°–580° F. where it is subjected to steam for 30–60 seconds. The doors of the oven are opened briefly to permit the steam to escape and the bagel is permitted to remain in a moist air for another 2 minutes. The skin of the bagel is smooth and shiny. The bagel is then baked at 500° F. for 10–12 minutes.

In comparison to the above baking times, it is surprising that the processing time according to the present invention is remarkably reduced and more efficient than the prior art. It was not discovered until the invention was actually made that the bagel dough shell which is wrapped around the cream cheese acts as a perfect insulator during the baking processes in order to prevent denaturing of the cream cheese filler while at the same time permitting the bagel shell to bake. It is, however, necessary to cool the core temperature of the filled, rolled bagel dough product (i.e., to reduce the temperature of the cream cheese filling) between the skinning step (boiling or steaming) and the baking step. If the cooling step is omitted, the cream cheese at the core of the filled, rolled bagel dough product is not protected, becomes too warm, melts and denatures. The product is not palatable.

If the product is made with the cooling step as discussed, the product of the present invention contains cream cheese in the center thereof which significantly adds to the enjoyment of the bagel. That is, the cream cheese mediates the taste receptors in the tongue in order to enhance the enjoyment of the bagel dough.

Turning now to the specific skinning and baking process according to the present invention, the filled, rolled bagel dough product produced in accordance with process of FIG. 1 which has the appearance of FIGS. 2 and 3, comprises approximately 4 oz. of bagel dough wrapped around a core of 1⁄4 inch cream cheese. This product may be placed in boiling water for 2 minutes, preferably 1 minute on each side.

The boiled product with the gelatinized skin is removed to a cooler for approximately 10 minutes to reduce the core temperature until the cream cheese is about 40°–50° F. Chilling the product after the outside had been set by boiling (or steaming as discussed below) is necessary to cool the cream cheese filling enough to prevent denaturalization of the cream during baking, while effectively pasteurizing the cream cheese and giving the cream cheese freezable characteristics as discussed above. After cooling, the product is placed in an impinger conveyor oven (similar to a commercial pizza oven) for quick baking at 500° for about 4 minutes. Surprisingly, the dough is completely baked after 4 minutes and the core, though warm, can be cooled again and retains the characteristic texture and flavor of fresh cream cheese.

The diameters of the bagel as discussed above are the dimensions and sizes of a conventional New York style bagel, but it will be readily understood that any dimension of bagel from miniature to extra large can be produced by the process discussed above, and by modifying the processing steps discussed above.

Further, because it is not necessary to bake the core of the bagel, a much larger bagel then can be produced by the conventional processes can be produced by the process of the present invention.

This very large bagel dough product can be sliced and served.

In addition to being rolled into a conventional torroidal or circular shape, the filled, rolled bagel dough product of the present invention can be twisted into any shape such as a pretzel shape, a spiral, a coil, a bow, etc.

It is a surprising benefit of the present invention that the cream cheese is deposited perfectly in the center of the bagel using the processing steps and parameters according to the present invention, with the exception of approximately a ¾ inch segment which is solid dough and contains no cream cheese. The solid segment containing no cream cheese is the segment in which the leading and trailing edges of the initial cylinder of bagel dough are pressed together, these leading and trailing edges containing no cream cheese.

As a separate process from the boiling and baking process discussed above, the filled, rolled bagel dough product according to the present invention may be produced by a step of steaming for approximately 6 minutes in order to substantially completely cook the dough. The step of steaming acts chemically to modify the cream cheese and enable the cheese to be frozen, together with the bagel shell, so that the texture of the cheese, upon reheating, is the same as if it had never been frozen. Thus, not only does the process of the invention provide a novel bakery product that provides both bagel and cream cheese in a conveniently packaged, prepared combination, but it enables lengthening of the cream cheese shelf-life over what would normally be available for separately sold bagels and cream cheese.

Steaming is followed by cooling for, e.g., approximately 10 minutes in a retarder, and then baking for approximately 2 minutes to form a browned crust on the bagel. This baking step could even be referred to as browning, since it is not longer than the browning step in a conventional baking process.

The dough for forming the bagel is preferably from 3 to 5 oz. and the cream cheese deposited thereon is preferably 1½ oz. but these proportions and quantities may be readily varied depending on taste.

Besides forming a completely baked bagel shaped product in accordance with the above, the product may be substantially baked and then frozen for storage or shipment to retail outlets. This frozen product may be defrosted and then placed in a 350°–400° F. oven for approximately 2 minutes in order to heat the crust. Salt, poppy seed, dried onions, etc. may be topped onto the bagel prior to baking, as discussed above, or toppings such as cheese may be placed on top of the bagel and the bagel placed in an oven for a short period of time in order to cause the cheese or toppings to melt and adhere to the bagel.

Although the filled rolled bagel dough product was described herein with great detail with respect to an embodiment comprising cream cheese filled in a bagel shell, it will be readily apparent that the combination is capable of use in a number of other applications. Although this invention has been described in its preferred form with a certain of particularity with respect to a cream cheese filled bagel dough product, it is understood that the present disclosure of the preferred form has been made only by way of example and that numerous changes in the details of structures and the composition of the combination may be resorted to without departing from the spirit and scope of the invention.

Now that the invention has been described, I claim:

1. A process for making a filled bagel dough product, said process comprising the steps of:

(A) mixing and kneading a yeast bagel dough;

(B) proofing the product of step (A) to activate said yeast to raise said dough through fermentation;

(C) forming a substantially rectangular sheet of bagel dough having a width W, a length L, a lengthwise longitudinal axis, a widthwise transverse axis, a first transverse edge, longitudinal side edges, and a second transverse edge;

(D) depositing a strand of a cream cheese filler material on top of said substantially rectangular sheet of bagel dough along the longitudinal axis of the substantially rectangular sheet of bagel dough;

(E) causing the substantially rectangular sheet of bagel dough to roll around said strand of cream cheese such that said longitudinal edges of said substantially rectangular sheet of bagel dough contact and fuse and to form a cream cheese filled bagel dough cylinder having first and second ends and a cream cheese core;

(F) causing the first and second ends of said cream cheese filled bagel dough cylinder to contact and fuse and form a torroidal bagel shape;

(G) baking said torroidal bagel shape by a process involving:

(1) boiling in water for approximately 2 minutes, cooling, the boiled bagel shape for a period of time sufficient to obtain a core temperature of the cream cheese filler material at about 40–50 degree F., and baking for about 4 minutes, or (2) steaming for approximately 6 minutes, cooling the steamed bagel shape for approximately 10 minutes or cooling the steamed bagel shape to obtain a core temperature of the cream cheese filler material at about 40–50 degree F., and baking for approximately 2 minutes.

2. A process as in claim 1, wherein said step (E) is performed by depositing said substantially rectangular sheet of bagel dough onto a first flexible conveyor belt having an upper surface and side edges, drawing said first conveyor belt through a tube, the substantially rectangular sheet of bagel dough proceeding with longitudinal edges parallel to the side edges of said first conveyor belt, to cause said side edges of said conveyor belt to roll upwards and around and causing said first conveyor belt to take the shape of said tube and simultaneously causing the longitudinal edges of said substantially rectangular sheet of bagel dough to contact and fuse and to form said cream cheese filled bagel dough cylinder having said first and second cylinder ends and said cream cheese core.

3. A process as in claim 1, wherein step (F) is performed by depositing said cream cheese filled bagel dough cylinder transversely across a second conveyor belt having an upper surface and side edges, drawing said second conveyor belt through a second tube, said second tube containing a stationary mandrel in the center axis thereof, to cause said side edges of said second conveyor belt to roll upwards and around and causing said second conveyor belt to take the shape of said second tube and simultaneously causing the first and second ends of said cream cheese filled bagel dough cylinder having first and second cylinder ends and a cream cheese core to contact and fuse and form a torroid and causing said torroid to roll between said moving conveyor belt and said stationary mandrel, thereby forming said torroidal bagel shape.

4. A process as in claim 1, wherein said filler is a natural cream cheese.

5. A process as in claim 3, wherein said cream cheese is ricotta.

6. A process as in claim 1, wherein said cream cheese is an artificial cream cheese.

7. A process as in claim 5, wherein said artificial cream cheese is a tofu based artificial cream cheese.

8. A process as in claim 1, wherein said product after proofing is from 1 to 3 inches thick and from 2 to 6 inches in diameter.

9. A process as in claim 1, wherein said product after proofing weighs from 2 to 10 ounces.

10. A process as in claim 1, wherein said product after proofing weighs from 3 to 6 ounces.

11. A process as in claim 1, comprising further baking said product to produce a substantially dehydrated product.

12. A process as in claim 1, further comprising a step of freezing the product of step (G1) or (G2).

13. A process as in claim 1, wherein said baking process is process (G1).

14. A process as in claim 1, wherein said baking process is process (G2).

15. A process as in claim 1, wherein said dough is comprised of flour having a protein content of 13.5–14% of flour weight, a water content of 50–53%, a salt content of 1.5–2.2% of flour weight, and a yeast content of 0.5–2% of flour weight.

16. A process for making a filled bagel dough product, said process comprising the steps of:

(A) mixing and kneading a yeast bagel dough;

(B) proofing the product of step (A) to activate said yeast to raise said dough through fermentation;

(C) forming a substantially rectangular sheet of bagel dough having a width W, a length L, a lengthwise longitudinal axis, a widthwise transverse axis, a first transverse edge, longitudinal side edges, and a second transverse edge;

(D) depositing a strand of a cream cheese filler material on top of said substantially rectangular sheet of bagel dough along the longitudinal axis of the substantially rectangular sheet of bagel dough;

(E) depositing said substantially rectangular sheet of bagel dough onto a first flexible conveyor belt having an upper surface and side edges, said flexible conveyor belt having a belt width approximately corresponding to the width W of said rectangular sheet of bagel dough, drawing said conveyor belt through a first tubular orifice, the substantially rectangular sheet of bagel dough proceeding with longitudinal edges parallel to the side edges of said conveyor belt, to cause said side edges of said conveyor belt to roll upwards and around and causing said conveyor belt to take the shape of said first tubular orifice and simultaneously causing the longitudinal edges of said substantially rectangular sheet of bagel dough to contact and fuse and to form a cream cheese filled bagel dough cylinder having first and second cylinder ends and a cream cheese core;

(F) depositing said cream cheese filled bagel dough cylinder transversely across a second flexible conveyor belt having an upper surface and side edges, said second flexible conveyor belt having a belt width approximately corresponding to the width of said rectangular sheet of bagel dough, drawing said second conveyor belt through a second tubular orifice, said second tubular orifice containing a stationary mandrel in the center axis thereof, to cause said side edges of said second conveyor belt to roll upwards and around and causing said second conveyor belt to take the shape of said second tubular orifice and simultaneously causing the first and second ends of said cream cheese filled bagel dough cylinder having first and second cylinder ends and a cream cheese core to contact and fuse and form a torroid and causing said torroid to roll between said moving second conveyor belt and said stationary mandrel, thereby forming torroidal bagel shape (G) baking said torroidal bagel shape by a process involving:

(1) boiling in water for approximately 2 minutes, cooling the boiled bagel shape for a period of time sufficient to obtain a core temperature of the cream cheese filler material at about 40–50 degree F., and baking for about 4 minutes, or (2) steaming for approximately 6 minutes, cooling the steamed bagel shape for approximately 10 minutes or cooling the steamed bagel shape to obtain a core temperature of the cream cheese filler material at about 40–50 degree F., and baking for approximately 2 minutes.

* * * * *